Patented Nov. 13, 1934

1,980,518

UNITED STATES PATENT OFFICE 1,980,518

MATERIAL FOR COATING METAL

James H. Gravell, Elkins Park, Pa., assignor to American Chemical Paint Company, Ambler, Pa., a corporation of Delaware No Drawing. Application May 17, 1932, Serial No. 611,926

7 Claims. (Cl. 148—6)

This invention relates to an improved method, as well as to a material, for coating metallic surfaces, particularly sheet steel, galvanized iron and zinc, although it may be utilized for treating metal in general.

The principal object of the invention is to provide metals with a suitable surface for receiving paint and similar coatings, and, generally stated, the invention provides a method, as well as a material, for chemically producing a coating on metal which will be adherent to a very high degree and which will be substantially completely and permanently rust-proof when subsequently covered as by paint, or the like.

A more detailed recitation of the objects of the invention includes the provision of a method and a material for surfacing metal so as to increase the resistance of the painted finish against the corrosion effects of the atmosphere; to remove extraneous matter from the surface of the metal to be painted; to increase the resistance of the prepared surface to corrosion effects while waiting for painting; to reduce the cost of preparing metal surfaces for painting and generally to improve the art of surfacing metal in preparation for the painting operation.

In carrying out my invention I prefer to apply an admixture comprising an acid salt resulting from a metal more basic than iron and a trihydric acid, an ionizing solvent and an absorbent; evaporating or permitting the mixture to dry on the metal; and then removing the resultant residue as by washing, wiping or brushing.

Many acid salts may be used according to the present invention, but my experience to date indicates that best results are to be obtained when such salts are of metals more basic than iron, and I prefer a salt which is obtained by the use of a trihydric acid such as phosphoric acid or arsenic acid. Monocalcium phosphate is a salt having the characteristics which I prefer, and since it is easily obtainable and comparatively inexpensive, it is especially suitable for commercial operations, although good results may be obtained with the corresponding salts of ammonium, sodium, potassium, etc. as typifying salts of the alkali metals.

The ionizing solvent may be any of those which are compatible with admixtures conforming with my invention, such as glacial acetic acid, methyl or ethyl alcohol, or water, and I have found that water produces the best results.

The absorbent material may be either organic or inorganic and is preferably used in finely divided form. Of the organic materials powdered wood or raw starch are examples, and of the inorganic materials substances such as fuller's earth, koalin or bentonite may be mentioned, and in the following disclosure I refer to all of such inorganic substances as "unburnt clay".

If the metal being surfaced is covered with a thin film of oil, as often happens with commercial metal, it is well to add to my admixture a wetting agent to disperse the oil film and permit my admixture to come directly into contact with the metal. When a wetting agent is used it may be any one of the various sulphonic acids or their salts which are commonly employed for this purpose, such as the sulphonic acid of an aromatic hydrocarbon having an isopropyl radical in the nucleus (sometimes called "Neomerpin") or it may be one of the higher alcohols such as amalyic alcohol or butyl alcohol, or it may be any compatible material of wetting agent properties.

When mono-calcium phosphate is used as the acid salt in my admixture, according to the above disclosure, the surface produced on sheet steel is substantially white or light gray in color, without much hiding power, so in order to improve its appearance I prefer to add an agent to the mixture which has the property of darkening the surface produced, thereby increasing its hiding power and enhancing its appearance.

I have found that this effect may be produced by the use of certain soluble salts of metals which are less basic than iron, such, for example, as the salts of mercury, silver, platinum or copper, all of which produce good results. I prefer copper nitrate because it is very soluble and relatively inexpensive.

By way of specific example an admixture according to my invention may be made by mixing the following:—

| | |
|---|---|
| Unburnt clay [fuller's earth] | 30.00 pounds |
| Mono-calcium phosphate [Ca($H_2PO_4$)$_2$.$H_2O$] | 5.00 pounds |
| Cupric nitrate [Cu($NO_3$)$_2$.$3H_2O$] | .50 pounds |
| Butyl alcohol | 2.40 pounds |
| Water | 6.32 gallons |

The foregoing mixture will produce a liquid material having the viscosity of paint or whitewash, but if desired the water may be omitted to produce a substantially dry powder which may be stored or shipped and the water added when required for use. The mixture may also be made up by using only a portion of the water specified so as to form a paste, in which event the balance of the water is added before using the material.

Before carrying out my method the metal should first be freed from extraneous matter, such as paint, thick oil films, rust, etc., and this may be accomplished by any of the accepted methods of preparing metal, as, for instance, by treating it with an admixture of phosphoric acid and a wetting agent and then removing the cleaning material, together with the resultant residue.

After the metal is so cleaned my improved admixture is then applied as by brushing, dipping or spraying, and I have found that the use of about one gallon of the mixture for every two hundred and fifty square feet of metal to be coated will produce good results. The amount, however, may, of course, vary within considerable limits, depending somewhat upon the nature of the metal and the condition of the surface. A suitable quantity can readily be determined by a little experiment in each individual instance.

After the admixture is applied I then permit it to dry or evaporate it preferably to substantial dryness. The time required for drying will, of course, depend very largely on atmospheric conditions, but it will usually vary somewhere between several hours under ordinary room conditions to ten minutes in an oven heated to 200° F.

During the drying period my improved admixture chemically acts on the metal to form an adherent surface thereon, a residue being left which can then be removed by brushing, wiping or washing with water.

The surface formed in accordance with the foregoing method and by means of my improved material is dark gray in color, is very adherent and sufficiently hard to withstand scuffing with steel wool. It is substantially rust-proof and will remain free from discoloration under ordinary room conditions almost indefinitely, at least for a year or more. It is, therefore, able to resist corrosion until the surface is protected by a permanent covering such as a coat of paint or lacquer.

In view of the fact that any thin films of oil left on the metal are absorbed by the resultant residue which is subsequently removed, it will be seen that the improved surface which I provide is entirely free from oil and this may be proved by the well known water break test.

Since the surface is free from oil and other deleterious extraneous matter, it produces an improved base on which the painted finish firmly adheres and which acts as a barrier to prevent any dampness which may seep through the paint from reaching and corroding the metal beneath; hence metal treated by my method and afterwards painted is better able to resist corrosion and abrasion effects than are metals treated by processes and materials heretofore in use.

I am able to carry out my process with inexpensive materials and unskilled labor which makes it possible to reduce the cost of preparing metal for painting while, at the same time, improving the quality of the painted finish.

I claim:—

1. As a new article of manufacture, a material for surfacing metal including mono-calcium phosphate, water, unburnt clay and copper nitrate.

2. As a new article of manufacture, a material for surfacing metal including mono-calcium phosphate, water, unburnt clay, copper nitrate and butyl alcohol.

3. As a new article of manufacture, a material for surfacing metal including mono-calcium phosphate, water, unburnt clay and a salt of a metal less basic than iron typified by copper nitrate as herein described.

4. As a new article of manufacture, a material for surfacing metal including an acid salt resulting from an alkali or alkaline earth metal and an inorganic trihydric metal etching acid, said salt being typified by mono-calcium phosphate; an ionizing solvent; unburnt clay; and a salt of a metal less basic than iron typified by copper nitrate as herein described.

5. As a new article of manufacture, a material for surfacing metal including an acid salt resulting from an alkali or alkaline earth metal and an inorganic trihydric metal etching acid, said salt being typified by mono-calcium phosphate; an ionizing solvent; unburnt clay; a salt of a metal less basic than iron typified by copper nitrate as herein described; and a compatible wetting agent of that class including sulphonic acids and their salts, and alcohols.

6. As a new composition of matter, a material for surfacing metal including the following ingredients approximately in the proportion indicated:

| | |
|---|---|
| Unburnt clay | 30.00 pounds |
| Mono-calcium phosphate [$Ca(H_2PO_4)_2.H_2O$] | 5.00 pounds |
| Cupric nitrate [$Cu(NO_3)_2.3H_2O$] | .50 pounds |
| Butyl alcohol | 2.40 pounds |

7. As a new composition of matter, a material for surfacing metal including the following ingredients approximately in the proportion indicated:

| | |
|---|---|
| Unburnt clay | 30.00 pounds |
| Mono-calcium phosphate [$Ca(H_2PO_4)_2.H_2O$] | 5.00 pounds |
| Cupric nitrate [$Cu(NO_3)_2.3H_2O$] | .50 pounds |
| Butyl alcohol | 2.40 pounds |

Water sufficient to produce a liquid having the viscosity of paint.

JAMES H. GRAVELL.